United States Patent
Sawa

(10) Patent No.: US 10,109,856 B2
(45) Date of Patent: Oct. 23, 2018

(54) NEGATIVE ELECTRODE FOR NONAQUEOUS ELECTROLYTE SECONDARY BATTERIES

(71) Applicant: SANYO Electric Co., Ltd., Daito-shi, Osaka (JP)

(72) Inventor: Shouichiro Sawa, Tokushima (JP)

(73) Assignee: SANYO Electric Co., Ltd., Daito-shi (JP)

(*) Notice: Subject to any disclaimer, the term of this patent is extended or adjusted under 35 U.S.C. 154(b) by 0 days.

(21) Appl. No.: 14/911,168

(22) PCT Filed: Sep. 18, 2014

(86) PCT No.: PCT/JP2014/004813
§ 371 (c)(1),
(2) Date: Feb. 9, 2016

(87) PCT Pub. No.: WO2015/045341
PCT Pub. Date: Apr. 2, 2015

(65) Prior Publication Data
US 2016/0204431 A1    Jul. 14, 2016

(30) Foreign Application Priority Data
Sep. 27, 2013  (JP) ................ 2013-201520

(51) Int. Cl.
*H01M 4/78* (2006.01)
*H01M 4/38* (2006.01)
(Continued)

(52) U.S. Cl.
CPC ........... *H01M 4/483* (2013.01); *H01M 4/131* (2013.01); *H01M 4/134* (2013.01); *H01M 4/364* (2013.01);
(Continued)

(58) Field of Classification Search
CPC ...... H01M 4/483; H01M 4/134; H01M 4/131; H01M 10/0569; H01M 4/386;
(Continued)

(56) References Cited

U.S. PATENT DOCUMENTS

2005/0064291 A1* 3/2005 Sato ............... H01M 4/134
429/233
2007/0031733 A1* 2/2007 Kogetsu ............... H01M 4/134
429/245
(Continued)

FOREIGN PATENT DOCUMENTS

CN    101436656 A    5/2009
JP    2006-107912 A   4/2006
(Continued)

OTHER PUBLICATIONS

Machine translation of CN 101436656, retrieved from <https://worldwide.espacenet.com/?locale=en_EP> dated Feb. 5, 2018.*
(Continued)

*Primary Examiner* — Cynthia Kyung Soo Walls
(74) *Attorney, Agent, or Firm* — Westerman, Hattori, Daniels & Adrian, LLP

(57) ABSTRACT

A negative electrode including a current collector, a first mix layer containing first active material particles and a binder, and a second mix layer containing second active material particles and a binder. The first mix layer is placed on the current collector. The second mix layer overlies the first mix layer. The first active material particles and the second active material particles contain Si. The second mix layer includes a plurality of pillar portions. The expansion coefficient of the second mix layer during charge is higher than the expansion coefficient of the first mix layer during charge. The electrical conductivity of the first mix layer is higher than the electrical conductivity of the second mix layer.

6 Claims, 1 Drawing Sheet

(51) Int. Cl.
| | |
|---|---|
| *H01M 4/48* | (2010.01) |
| *H01M 4/131* | (2010.01) |
| *H01M 4/36* | (2006.01) |
| *H01M 4/62* | (2006.01) |
| *H01M 4/66* | (2006.01) |
| *H01M 10/0525* | (2010.01) |
| *H01M 10/0569* | (2010.01) |
| *H01M 4/134* | (2010.01) |
| *H01M 10/052* | (2010.01) |
| *H01M 4/02* | (2006.01) |

(52) U.S. Cl.
CPC ........... *H01M 4/366* (2013.01); *H01M 4/386* (2013.01); *H01M 4/625* (2013.01); *H01M 4/661* (2013.01); *H01M 10/052* (2013.01); *H01M 10/0525* (2013.01); *H01M 10/0569* (2013.01); *H01M 2004/027* (2013.01); *H01M 2004/028* (2013.01); *H01M 2300/0034* (2013.01); *H01M 2300/0037* (2013.01); *Y02E 60/122* (2013.01)

(58) Field of Classification Search
CPC .. H01M 4/625; H01M 4/661; H01M 10/0525; H01M 4/364; H01M 4/366; H01M 10/052; H01M 2004/028; H01M 2300/0034; H01M 2300/0037
See application file for complete search history.

(56) References Cited

U.S. PATENT DOCUMENTS

| | | | |
|---|---|---|---|
| 2007/0166613 A1* | 7/2007 | Kogetsu | H01M 4/134 429/218.1 |
| 2008/0171263 A1* | 7/2008 | Ugaji | H01M 4/0423 429/218.1 |
| 2008/0193848 A1* | 8/2008 | Fujikawa | H01M 4/70 429/231.95 |
| 2009/0176158 A1* | 7/2009 | Ugaji | H01M 4/134 429/220 |
| 2009/0214956 A1 | 8/2009 | Prieto et al. | |
| 2010/0040951 A1* | 2/2010 | Yamamoto | H01M 4/134 429/231.95 |
| 2010/0119948 A1* | 5/2010 | Hasegawa | H01M 4/0421 429/231.95 |
| 2010/0151320 A1* | 6/2010 | Ugaji | H01M 4/0423 429/218.1 |
| 2010/0203387 A1 | 8/2010 | Yamamoto et al. | |
| 2010/0285356 A1* | 11/2010 | Choi | H01M 4/0435 429/209 |
| 2010/0285368 A1* | 11/2010 | Yamamoto | H01M 4/0421 429/231.95 |
| 2010/0291441 A1* | 11/2010 | Ugaji | H01M 4/13 429/231.95 |
| 2011/0020536 A1 | 1/2011 | Yamamoto et al. | |
| 2011/0027650 A1* | 2/2011 | Yamamoto | H01M 4/134 429/218.1 |
| 2011/0143195 A1* | 6/2011 | Ito | H01M 4/134 429/199 |
| 2011/0250501 A1* | 10/2011 | Uchida | H01M 4/134 429/239 |

FOREIGN PATENT DOCUMENTS

| | | |
|---|---|---|
| JP | 2007-194076 A | 8/2007 |
| JP | 2007-200686 A | 8/2007 |
| JP | 2008-258154 A | 10/2008 |
| JP | 4351732 B2 | 10/2009 |
| JP | 2010-33744 A | 2/2010 |
| JP | 2010-92878 A | 4/2010 |
| JP | 2010-262752 A | 11/2010 |
| JP | 2011-514630 A | 5/2011 |

OTHER PUBLICATIONS

International Search Report dated Dec. 9, 2014, issued in counterpart application No. PCT/JP2014/004813 (2 pages).
Office Action dated Mar. 24, 2017, issued in counterpart Chinese application No. 201480047997.4. with English Translation (13 pages).

* cited by examiner

NEGATIVE ELECTRODE FOR NONAQUEOUS ELECTROLYTE SECONDARY BATTERIES

TECHNICAL FIELD

The present invention relates to a negative electrode for nonaqueous electrolyte secondary batteries.

BACKGROUND ART

It has been investigated that a silicon-containing material is used as a negative electrode active material for lithium secondary batteries. In the case where the silicon-containing material is used as an active material, the active material is pulverized or is separated from a current collector because the volume of the active material expands or contracts when lithium is stored or is released. Therefore, there is a problem in that current collection in an electrode decreases and charge/discharge cycle characteristics deteriorate.

Patent Literature 1 discloses the use of a negative electrode in which the percentage of a binder in the vicinity of a negative electrode current collector is 2.5 times or more the percentage of the binder in a position away from the negative electrode current collector.

Patent Literature 2 discloses that the deformation of a current collector is suppressed and failures due to short circuits are reduced in such a manner that a silicon oxide represented by $SiO_x$ is used as an active material, $SiO_x$ with high oxygen concentration is placed on the current collector side, and $SiO_x$ with low oxygen concentration is placed thereon.

CITATION LIST

Patent Literature

PTL 1: Japanese Published Unexamined Patent Application No. 2007-200686
PTL 2: Japanese Published Unexamined Patent Application No. 2006-107912

SUMMARY OF INVENTION

Technical Problem

However, the techniques disclosed in Patent Literatures 1 and 2 have a problem that current collection properties are reduced by expansion and contraction and charge/discharge cycle characteristics are reduced because the adhesion between a mix layer and a current collector is insufficient.

In order to solve the above problem, a negative electrode for nonaqueous electrolyte secondary batteries according to the present invention includes a current collector, a first mix layer containing first active material particles and a binder, and a second mix layer containing second active material particles and a binder. The first mix layer is placed on the current collector. The second mix layer overlies the first mix layer. The second mix layer includes a plurality of pillar portions such that a space is present between each pair of the neighboring pillar portions. The expansion coefficient of the second mix layer during charge is higher than the expansion coefficient of the first mix layer during charge. The electrical conductivity of the first mix layer is higher than the electrical conductivity of the second mix layer.

Advantageous Effects of Invention

According to the present invention, a lithium secondary battery having high initial charge/discharge efficiency and excellent cycle characteristics can be obtained.

DESCRIPTION OF EMBODIMENTS

Figure 1:
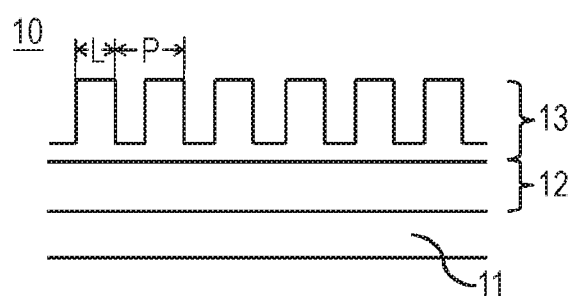
FIG. 1 is a schematic sectional view of a negative electrode according to an embodiment of the present invention.

Embodiments of the present invention are described below in detail. Drawings referred to in the description of the embodiments are schematically illustrated and therefore the dimensional ratio and the like of components depicted in the drawings are different from those of actual components in some cases. The specific dimensional ratio and the like should be determined in consideration of descriptions below.

A negative electrode according to an embodiment of the present invention is used in a nonaqueous electrolyte secondary battery. The nonaqueous electrolyte secondary battery includes a positive electrode, the negative electrode, a nonaqueous electrolyte containing a nonaqueous solvent, and a separator.

[Negative Electrode]

The negative electrode 10 is described below in detail with reference to FIGS. 1 to 3. As shown in FIG. 1, the negative electrode includes a current collector 11, a first mix layer 12 which contains first active material particles and a binder and which is placed on the current collector 11, and a second mix layer 13 which contains second active material particles and a binder and which overlies the first mix layer. The second mix layer 13 includes a base portion and pillar portions placed on the base portion. The expansion coefficient of the second mix layer 13 during charge is higher than the expansion coefficient of the first mix layer 12 during charge. The electrical conductivity of the first mix layer 12 is higher than the electrical conductivity of the second mix layer 13.

Since the second mix layer 13 includes the pillar portions, the expansion of the second mix layer 13 that is associated with the expansion of the second active material particles is absorbed by spaces present between the pillar portions to the maximum extent. This reduces the stress between the second mix layer 13 and the current collector 11. In addition, since the first mix layer 12, which is lower in expansion coefficient during charge than the second mix layer 13, is placed between the second mix layer 13 and the current collector 11 so as to be in contact with the current collector 11, the stress at the interface between the mix layer and the current collector can be reduced, the interface therebetween suffering the highest stress. Reducing the stress applied to the current collector by the above configuration allows the separation of the mix layer from the current collector in association with charge/discharge cycle to be suppressed.

In the case where the first mix layer, which is lower in expansion coefficient during charge than the second mix layer, is placed between the second mix layer and the current collector so as to be in contact with the current collector for the purpose of reducing the stress applied to the current collector, when the electrical conductivity of the first mix layer is lower than the electrical conductivity of the second mix layer, the battery has reduced initial efficiency. In the case where a mix layer with high electrical conductivity is placed between a current collector and an interface, that is, in the case where the first mix layer, which is lower in expansion coefficient during charge than the second mix layer, is placed between the second mix layer and the current collector so as to be in contact with the current collector, when the electrical conductivity of the first mix layer is higher than the electrical conductivity of the second mix layer, the increase of initial efficiency and the enhancement of cycle characteristics can be both achieved.

Figure 2:
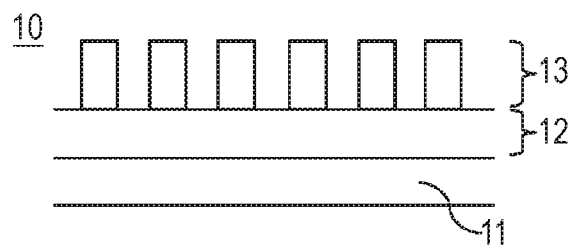
FIG. 2 is a schematic sectional view of a negative electrode according to another embodiment of the present invention.

As exemplified in FIG. 2, the second mix layer 13 may include pillar portions only.

Figure 3:
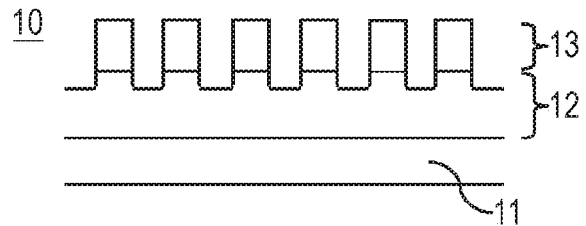
FIG. 3 is a schematic sectional view of a negative electrode according to another embodiment of the present invention.

As exemplified in FIG. 3, the first mix layer 12 may include a base portion in contact with the current collector and pillar portions placed on the base portion, the second mix layer 13 may include pillar portions only, and each of the pillar portions of the second mix layer 13 may be placed on a corresponding one of the pillar portions of the first mix layer 12.

The first active material particles preferably contain Si and O. Particles of $SiO_x$ (x is 0.5 to 1.5) are cited as such particles.

The $SiO_x$ particles are preferably surface-coated with amorphous carbon. $SiO_x$ has high electronic resistance and therefore reduce load characteristics. By surface-coating the $SiO_x$ particles with amorphous carbon, electronic conductivity can be imparted to the $SiO_x$ particles and the electrical conductivity of a mix layer can be increased. Carbon has a larger specific surface area as compared to $SiO_x$ and therefore is likely to hold a binder. Therefore, using the $SiO_x$ particles coated with amorphous carbon as the second active material particles of the second mix layer, which is placed close to the current collector, enables much of the binder to be placed close to the interface of the current collector. Therefore, the adhesion between the second mix layer and the current collector can be further improved and the separation of the first mix layer and the second mix layer from the current collector can be suppressed.

The second active material particles preferably contain $SiO_x$ particles, Si particles, or Si alloy particles. Examples of a Si alloy include a solid solution of silicon with one or more different elements, an intermetallic compound of silicon and one or more different elements, and a eutectic alloy of silicon and one or more other elements. Examples of a method for producing such an alloy include an arc melting method, a liquid quenching method, a mechanical alloying method, a sputtering method, a chemical vapor deposition method, and a calcination method. In particular, examples of the liquid quenching method include a single-roll quenching method, a twin-roll quenching method, and various atomizing methods such as a gas atomizing method, a water atomizing method, and a disk atomizing method.

In the case where the $SiO_x$ particles is used as the first active material particles or the second active material particles, carbon materials such as carbon black, acetylene black, Ketjenblack, graphite, and mixtures of two or more of these materials are preferably used together as negative electrode active materials.

The expression "the second mix layer 13 overlies the first mix layer 12" includes the case where the second mix layer is placed on the first mix layer such that the second mix layer and the first mix layer are in contact with each other and the case where the second mix layer and the first mix layer are not in contact with each other and the second mix layer is placed above the first mix layer. A third mix layer (not shown) is preferably present between the first mix layer 12 and the second mix layer 13. The expansion coefficient of the third mix layer during charge is higher than the expansion coefficient of the first mix layer 12 during charge and is lower than the expansion coefficient of the second mix layer 13 during charge. The presence of the third mix layer allows the stress applied to the current collector to be reduced.

Examples of a combination of the first mix layer 12 and the second mix layer 13 include the case where the first mix layer 12 contains the $SiO_x$ particles coated with carbon and the second mix layer 13 contains Si particles, the case where the first mix layer 12 contains the $SiO_x$ particles coated with carbon and a carbon material and the second mix layer 13 contains Si particles, and the case where the first mix layer 12 and the second mix layer 13 both contain the $SiO_x$ particles coated with carbon and the carbon material and the ratio of the mass of the $SiO_x$ particles to the sum of the masses of the $SiO_x$ particles and carbon material in the first mix layer 12 is less than the ratio of the mass of the $SiO_x$ particles to the sum of the masses of the $SiO_x$ particles and carbon material in the second mix layer 13.

The thickness of the first mix layer 12 is preferably 10 μm or less and more preferably 5 μm or less. The thickness of the first mix layer 12 is preferably 2 μm or more. When the thickness of the first mix layer 12 is excessively large, the battery has reduced capacity in some cases. However, when the thickness of the first mix layer 12 is excessively small, cycle characteristics cannot be sufficiently enhanced in some cases.

In order to increase the energy density of an electrode, the thickness of the second mix layer 13 is preferably larger than the thickness of the first mix layer. Therefore, the thickness of the second mix layer 13 is preferably 10 μm or more. The thickness of the second mix layer 13 is preferably 50 μm or less. When the second mix layer 13 includes the base portion and the pillar portions, which are placed on the base portion, as shown in FIG. 1, the base portion of the second mix layer 13 preferably has a thickness of 5 μm to 10 μm and the pillar portions, which are placed on the base portion, preferably have a thickness of 10 μm to 50 μm.

The pillar portions of the second mix layer 13 are preferably alternately arranged. Alternately arranging the pillar portions enables spaces thereby formed to be optimized. The shape of the pillar portions is not particularly limited. The pillar portions may have a circular shape, a square shape, or another shape in cross section in a direction parallel to a longitudinal direction of the current collector. The pillar portions may have a rectangular shape, a square shape, a prismoidal shape, or another shape in cross section in a direction parallel to a thickness direction of the current collector. The pitch (P in FIG. 1) between the pillar portions is preferably 35 μm to 130 μm. The diameter (L in FIG. 1) of the pillar portions is preferably 30 μm to 100 μm. The first mix layer 12 and the second mix layer 13 preferably have a density of 0.7 $g/cm^2$ to 1.7 $g/cm^2$.

The average size $D_{50}$ (median size) of the first active material particles is preferably 10 μm or less and more preferably 5 μm or less. When the average size of the first active material particles is excessively large, the thickness of the first mix layer is large. The lower limit of the average size of the second active material particles is generally 2 μm.

The average size $D_{50}$ (median size) of the second active material particles is preferably 20 μm or less and more preferably 15 μm or less. When the average size of the second active material particles is excessively large, it is difficult to prepare an electrode. The lower limit of the average size of the second active material particles is generally 6 μm.

The binder used is preferably polyimide. Since the polyimide has high modulus of elasticity, the contact between particles is not broken by expansion or contraction during charge or discharge. Thus, active material particles can flexibly move at contact points of the binder. Even if the active material particles expand, the active material particles can move so as to be filled in spaces. Therefore, the reduction in number of contacts between the active material particles in the first and second mix layers can be suppressed.

The polyimide used is preferably one obtained by heat-treating a polyamic acid. This heat treatment causes the dehydrocondensation of the polyamic acid to produce the polyimide. In the present invention, the degree of imidization of the polyimide is preferably 80% or more. When the degree of imidization of the polyimide is less than 80%, the adhesion between the current collector and the active material particles is insufficient in some cases. The term "degree of imidization" as used herein refers to the mole percentage of produced polyimide with respect to a polyimide precursor such as a polyamic acid. Polyimide with a degree of imidization of 80% or more can be obtained in such a manner that, for example, an N-methylpyrrolidone (NMP) solution of a polyamic acid is heat-treated at a temperature 100° C. to 400° C. for 1 hour or more. In the case where the NMP solution of the polyamic acid is heat-treated at 350° C., the degree of imidization is 80% or 100% when the heat treatment time is about 1 hour or 3 hours, respectively.

The first mix layer is preferably formed by applying first mix layer slurry containing the first active material particles and the first binder. The second mix layer is preferably formed by applying second mix layer slurry containing the second active material particles and the second binder.

After the first mix layer slurry is applied, the second mix layer slurry may be applied without drying the first mix layer slurry. After the first mix layer slurry is applied and is then dried, the second mix layer slurry may be applied.

After the second mix layer slurry is applied and is then half-dried, the pillar portions can be formed using a die or the like.

In the case where the second mix layer slurry is applied without drying the first mix layer slurry, the first mix layer slurry and the second mix layer slurry are likely to be mixed to form the third mix layer.

After the first mix layer 12 and the second mix layer 13 are formed, the first mix layer 12 and the second mix layer 13 are preferably sintered under a non-oxidizing atmosphere.

Sintering is preferably performed under, for example, a vacuum or an inert atmosphere such as a nitrogen or argon atmosphere. The sintering temperature preferably ranges from 200° C. to 500° C. and more preferably 300° C. to 450° C. A sintering method used may be a spark plasma sintering method or a hot pressing method.

The amount of the binder in the first mix layer 12 and the second mix layer 13 may be appropriately adjusted depending on the amount or type of the first active material particles and the second active material particles in the first mix layer 12 and the second mix layer 13, respectively.

The expansion coefficient of the first mix layer 12 and the second mix layer 13 during charge can be determined in such a manner that each mix layer is separated from a charged electrode and a discharged electrode and the change in volume of the mix layer is determined. In particular, the expansion coefficient can be calculated from an equation below.

Expansion coefficient of mix layer (%)=[(volume of mix layer that is separated from charged electrode and is measured)/(volume of mix layer that is separated from discharged electrode and is measured)×100

The electrical conductivity of the first mix layer 12 and the second mix layer 13 can be measured using, for example, a four-probe resistivity meter (Laresta-GP manufactured by Mitsubishi Chemical Corporation).

[Positive Electrode]

The positive electrode is not particularly limited and may be one that can be used as a positive electrode for lithium secondary batteries. Examples of a positive electrode active material that can be used include lithium transition metal oxides such as lithium cobaltate, lithium manganate, and lithium nickelate.

[Nonaqueous Electrolyte]

Examples of an electrolyte salt of the nonaqueous electrolyte that can be used include $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}O_{10}$, lithium lower aliphatic carboxylates, LiCl, LiBr, LiI, chloroborane lithium, borates, and imide salts. In particular, $LiPF_6$ is preferably used from the viewpoint of ionic conductivity and electrochemical stability. The electrolyte salt may be used alone or in combination with another electrolyte salt. In 1 L of the nonaqueous electrolyte, 0.8 mol to 1.5 mol of the electrolyte salt is preferably contained.

Examples of a solvent of the nonaqueous electrolyte include cyclic carbonate esters, linear carbonate esters, and cyclic carboxylic esters. The cyclic carbonate esters are polypropylene carbonate (PC), ethylene carbonate (EC), and the like. The linear carbonate esters diethyl carbonate (DEC), ethyl methyl carbonate (EMC), dimethyl carbonate (DMC), and the like. The cyclic carboxylic esters are γ-butyrolactone (GBL), γ-valerolactone (GVL), and the like. The nonaqueous solvent may be used alone or in combination with another nonaqueous solvent.

EXAMPLES

The present invention is described below in detail with reference to examples. The present invention is not limited to the examples. Modifications can be appropriately made without departing from the gist of the present invention.

Experiment 1

(Preparation of Negative Electrode)

$SiO_x$ particles (x is 1.0) surface-coated with amorphous carbon, a graphite powder, and a binder precursor solution (a mixture of a polyamic acid resin which is a precursor of a polyimide resin and N-methylpyrrolidone (NMP) serving as a dispersion medium) were mixed together, whereby first mix slurry was prepared. The first mix slurry was applied to a current collector. The average size of the $SiO_x$ particles was 5 μm. The average particle size of the graphite powder was 3 μm. The mass ratio of the $SiO_x$ particles to the graphite powder to a negative electrode binder (which was obtained in such a manner that NMP was removed by drying the binder precursor solution and the binder precursor solution was subjected to a polymerization reaction and an imidization reaction) was 89:4:7. The negative electrode current collector used was 18 μm thick copper alloy foil (C7025 alloy foil with a composition of 96.2% by mass Cu, 3% by mass Ni, 0.65% by mass Si, and 0.15% by mass Mg) having both surfaces roughened with electrolytic copper. The surface roughness Ra (JIS B 0601-1994) of each surface of the copper alloy foil was 0.25 μm. The average peak distance S (JIS B 0601-1994) of each surface of the copper alloy foil was 0.85 μm. A first mix layer was formed on each of both surfaces of the copper alloy foil so as to have a density of 0.9 g/cm$^3$ and a thickness of 5 μm per surface.

Si particles, the graphite powder, and the binder precursor solution were mixed together, whereby second mix slurry was prepared. The average size of the Si powder was 3 μm. The average particle size of the graphite powder was 3 μm. The mass ratio of the Si particles to the graphite powder to the negative electrode binder (which was obtained in such a manner that NMP was removed by drying the binder precursor solution and the binder precursor solution was subjected to a polymerization reaction and an imidization reaction) was 89:4:7. The second mix slurry was applied to the second mix layers placed on the current collector and was half-dried. After half-dried negative electrode mix layers were molded in such a manner that a mold (a pore size of 80 μm and a pitch of 105 μm) having a plurality of pores was pressed against a surface of each negative electrode mix layer, the negative electrode mix layers were completely dried. Thereafter, the negative electrode mix layers were heat-treated at 400° C. for 10 hours. The mix density of the negative electrode mix layers was 0.7 g/cm$^3$. The thickness of the first and second mix layers was 39 μm per surface.

The length of the electrode was 380 mm. The thickness of the electrode was 50 mm. A nickel plate serving as a negative electrode current-collecting tab was connected to an uncoated portion present in an end section of the negative electrode. In the negative electrode of Experiment 1, each of the second mix layers was placed on a corresponding one of the first mix layers and had a base portion and pillar portions placed on the base portion. The thickness of the base portion was 5 μm. The thickness of the pillar portions was 29 μm.

(Preparation of Positive Electrode)

Li$_2$CO$_3$ and CoCO$_3$ were mixed together in a mortar such that the molar ratio of Li to Co was 1:1. Thereafter, the mixture was heat-treated at 800° C. for 24 hours in an air atmosphere, followed by crushing, whereby a powder of a lithium-cobalt composite oxide represented by the formula LiCoCO$_2$ was obtained. The average particle size of the lithium-cobalt composite oxide powder was 10 μm. The BET specific surface area of the obtained lithium-cobalt composite oxide powder (positive electrode active material powder) was 0.37 m$^2$/g.

The LiCoO$_2$ powder serving as a positive electrode active material powder, a carbon material powder serving as positive electrode conductive material particles, and polyvinylidene fluoride serving as a positive electrode binder were added to NMP serving as a dispersion medium, followed by kneading, whereby positive electrode slurry was obtained. The mass ratio of the LiCoO$_2$ powder to the carbon material powder to polyvinylidene fluoride (the LiCoO$_2$ powder:the carbon material powder:polyvinylidene fluoride) was 95:2.5:2.5.

The positive electrode slurry was applied to both surfaces of aluminium foil serving as a positive electrode current collector and was then dried, followed by rolling, whereby a positive electrode was prepared. The thickness of the aluminium foil was 15 μm. The length of the aluminium foil was 402 mm. The width of the aluminium foil was 50 mm. The length of each coated portion of the aluminium foil was 340 mm. The width of the coated portion of the aluminium foil was 50 mm. The mix density of positive electrode mix layers was 3.6 g/cm$^3$. The thickness of the positive electrode mix layers was 70 μm per surface. An aluminium plate serving as a positive electrode current-collecting tab was connected to an uncoated portion present in an end section of the positive electrode.

(Preparation of Nonaqueous Electrolyte Solution)

Fluoroethylene carbonate (FEC) and methyl ethyl carbonate (MEC) were mixed together under an argon atmosphere. The volume ratio of fluoroethylene carbonate (FEC) to methyl ethyl carbonate (MEC) (FEC:MEC) was 2:8. Lithium hexafluorophosphate (LiPF$_6$) was dissolved in the obtained solvent mixture, whereby a nonaqueous electrolyte solution with a LiPF$_6$ concentration of 1 mole per liter was obtained.

(Preparation of Electrode Assembly)

The positive electrode and the negative electrode were arranged to face each other with a 20 μm thick separator therebetween and were spirally wound around a cylindrical winding core such that the positive electrode tab and the negative electrode tab were outermost. Thereafter, the winding core was pulled out, whereby a spiral electrode assembly was prepared. Next, the spiral electrode assembly was squashed, whereby a flat electrode assembly was obtained. Incidentally, the separator used was a microporous membrane made of polyethylene.

(Preparation of Battery)

The flat electrode assembly and the nonaqueous electrolyte solution were provided in an aluminium-laminated enclosure at 25° C. and 1 atm under a carbon dioxide atmosphere, whereby Battery A1 was prepared.

(Measurement of Expansion Coefficient of First and Second Mix Layers)

SiO (that is, SiO$_x$ (x is 1.0)) and Si used as negative electrode active material particles were measured for expansion coefficient during charge as described below.

Expansion coefficient=(measured volume of mix layer separated from electrode in charged state)/ (measured volume of mix layer separated from electrode in discharged state)

The mix layers were scraped from an electrode. The scraped mix layers were measured for volume with a dry automatic densitometer (AccuPyc II 1340) manufactured by Shimadzu Corporation.

The expansion coefficient of the first mix layer and the expansion coefficient of the second mix layer were 160% and 220%, respectively, when Battery A1 was charged to the theoretical capacity.

Experiment 2

Battery B1 was prepared in substantially the same manner as that used in Experiment 1 except that a negative electrode including a base portion and pillar portions placed on the base portion was prepared in such a manner that no first mix layer slurry was used and second mix layer slurry was applied to a current collector so as to be in contact with the current collector. The mix density of a mix layer of Experiment 2 was 0.7 g/cm$^3$ and the thickness thereof was 28 μm per surface. Incidentally, the capacity of the negative electrode of Experiment 2 was adjusted so as to be equal to the capacity of the negative electrode of Experiment 1.

Batteries A1 and B1 were charged and discharged under conditions below and the initial charge/discharge efficiency given by Equation (1) below and the 50th-cycle capacity retention given by Equation (2) below were investigated. Investigation results are shown in Table 1.

(Charge/Discharge Conditions)

Charge conditions in first cycle

Constant-current charge was performed at a current of 50 mA for 4 hours. Thereafter, constant-current charge was performed at a current of 200 mA until the voltage of each battery reached 4.2 V. Furthermore, constant-voltage charge was performed at a voltage of 4.2 V until the current reached 50 mA.

Discharge conditions in first cycle

Constant-current discharge was performed at a current of 200 mA until the battery voltage reached 2.75 V.

Charge conditions in second and subsequent cycles

Constant-current charge was performed at a current of 1,000 mA until the battery voltage reached 4.2 V. Furthermore, constant-voltage charge was performed at a voltage of 4.2 V until the current reached 50 mA.

Discharge conditions in second and subsequent cycles

Constant-current discharge was performed at a current of 1,000 mA until the battery voltage reached 2.75 V.

(Equation for Calculating Initial Charge/Discharge Efficiency)

Initial charge/discharge efficiency (%)=(first-cycle discharge capacity/first-cycle charge capacity)× 100     (1)

(Equation for Calculating 50th-Cycle Capacity Retention)

Tenth-cycle capacity retention (%)=(tenth-cycle discharge capacity/first-cycle discharge capacity)× 100     (2)

TABLE 1

| Battery | Second layer/ first layer | Initial charge/discharge efficiency (%) | Capacity retention (%) |
|---|---|---|---|
| A1 | Si/SiO | 77 | 83 |
| B1 | Si/— | 74 | 76 |

The negative electrodes of Batteries A1 and B1 contained the Si particles and included the mix layers including the pillar portions. In the negative electrode of each of Batteries A1 and B1 which were charged and discharged, it was observed that fine cracks were radially formed in the base portion in a honeycomb pattern so at to extend from some of the pillar portions to the other pillar portions. Since the negative electrode of each of Batteries A1 and B1 contained the active material and the binder, expansion flexibly expanded or contracted in association with charge or discharge, respectively, and therefore uniform cracks were formed in the base portion to reduce the stress applied to the current collector. In Battery A1, each of the first mix layers containing the $SiO_x$ particles was placed between the current collector and a corresponding one of the second mix layers containing Si and therefore the stress at the interface between each mix layer and the current collector could be sufficiently reduced; hence, Battery A1 had enhanced cycle characteristics as compared to Battery B1. In Battery A1, each of the first mix layers containing the $SiO_x$ particles, which had low electronic conductivity, was placed between the current collector and a corresponding one of the second mix layers which contained the Si particles and which included the pillar portions. Since the $SiO_x$ particles were surface-coated with carbon, the initial charge/discharge efficiency could be increased and cycle characteristics could be enhanced.

Reference Experiments

In reference experiments, a mix layer containing $SiO_x$ particles surface-coated with amorphous carbon, a mix layer containing $SiO_x$ particles not surface-coated, and a mix layer containing Si particles were measured for electrical conductivity.

(Preparation of Mix Layers)

[Reference Experiment 1]

A mix layer containing $SiO_x$ particles (x is 1.0) surface-coated with amorphous carbon was prepared in the same manner as that used to prepare the first mix layers of the negative electrode in Experiment 1. The mix layer was formed on a surface of a current collector. The thickness of the mix layer was 8 μm.

[Reference Experiment 2]

A mix layer containing $SiO_x$ particles not surface-coated was prepared in substantially the same manner as that used in Reference Experiment 1 except that the $SiO_x$ particles not surface-coated was used. The thickness of the mix layer was 8 μm.

[Reference Experiment 3]

A mix layer containing $SiO_x$ particles not surface-coated was prepared in substantially the same manner as that used in Reference Experiment 1 except that the Si particles used to prepare the negative electrode in Experiment 1 were used. The thickness of the mix layer was 8 μm.

(Measurement of Electrical Conductivity)

The mix layers prepared as described above were measured for electrical conductivity using a four-probe resistivity meter (Laresta-GP manufactured by Mitsubishi Chemical Corporation).

TABLE 2

| Active material particles in mix layer | Carbon coatings on particle surfaces | Plate resistance (Ω) |
|---|---|---|
| SiO | Present | 2.8 |
| SiO | Not present | $9.9 \times 10^7$ or more |
| Si | Not present | $1.3 \times 10^7$ |

It is clear that the mix layer containing the $SiO_x$ particles surface-coated with amorphous carbon has lower plate resistance than the mix layer containing the Si particles and the mix layer containing the $SiO_x$ particles not surface-coated and therefore has high electrical conductivity.

Reference Signs List

10 Negative electrode
11 Current collector
12 First mix layer
13 Second mix layer

The invention claimed is:

1. A negative electrode for lithium secondary batteries, comprising a current collector, a first mix layer containing first active material particles and a binder, and a second mix layer containing second active material particles and a binder,
    wherein the first mix layer is placed on the current collector,
    the second mix layer overlies the first mix layer,
    the second mix layer includes a plurality of pillar portions such that a space is present between each pair of the neighboring pillar portions,
    the expansion coefficient of the second mix layer during charge is higher than the expansion coefficient of the first mix layer during charge, and
    the electrical conductivity of the first mix layer is higher than the electrical conductivity of the second mix layer, a third mix layer placed between the first mix layer and the second mix layer, wherein the expansion coefficient of the third mix layer during charge is higher than the expansion coefficient of the first mix layer during charge and is lower than the expansion coefficient of the second mix layer during charge.

2. The negative electrode for lithium secondary batteries according to claim 1, wherein the first active material particles and the second active material particles contain Si.

3. The negative electrode for lithium secondary batteries according to claim 1, wherein the first active material particles include SiOx particles (x is 0.5 to 1.5).

4. The negative electrode for lithium secondary batteries according to claim 3, wherein the SiOx particles include carbon coating layers.

5. The negative electrode for lithium secondary batteries according to claim 1, wherein the second active material particles include Si particles or Si alloy particles.

6. The negative electrode for lithium secondary batteries according to claim 1, wherein the second mix layer includes a base portion and the pillar portions are placed on the base portion.

* * * * *